United States Patent [19]
Hiramatsu

[11] Patent Number: 5,652,769
[45] Date of Patent: Jul. 29, 1997

[54] COSTAS LOOP AND DATA IDENTIFICATION APPARATUS

[75] Inventor: Tatsuo Hiramatsu, Higashiosaka, Japan

[73] Assignee: Sanyo Electric Co., Ltd., Osaka, Japan

[21] Appl. No.: 551,246

[22] Filed: Oct. 31, 1995

[30] Foreign Application Priority Data

Oct. 31, 1994 [JP] Japan .................... 6-266579

[51] Int. Cl.$^6$ ................ H03D 3/18; H03D 3/24
[52] U.S. Cl. ............ 375/327; 375/376; 329/308; 329/309
[58] Field of Search ............... 329/308, 50, 309; 375/332, 281, 328, 376; 325/320

[56] References Cited

U.S. PATENT DOCUMENTS

| | | | |
|---|---|---|---|
| 3,806,815 | 4/1974 | Fletcher et al. | 325/320 |
| 4,344,178 | 8/1982 | Waters | 375/81 |
| 4,704,582 | 11/1987 | Dixon et al. | 329/50 |
| 5,025,455 | 6/1991 | Nguyen | 375/53 |
| 5,438,594 | 8/1995 | Podolak | 375/332 |
| 5,440,268 | 8/1995 | Taga et al. | 329/308 |
| 5,528,195 | 6/1996 | Lu et al. | 329/308 |

*Primary Examiner*—Stephen Chin
*Assistant Examiner*—Mohammad Ghayour
*Attorney, Agent, or Firm*—Nikaido Marmelstein Murray & Oram LLP

[57] ABSTRACT

A costas loop includes a comparator, and a BPSK-modulated signal which is converted into a binary signal by the comparator is latched by a D-FF according to an oscillation signal from a VCO. An output of the D-FF becomes a demodulated signal. On the other hand, a phase-difference between the BPSK-modulated signal and the oscillation signal is detected by a phase-comparator, and the phase-difference is applied to the VCO via a loop filter. An oscillation frequency of the VCO is thus controlled according to a phase-comparison result.

7 Claims, 9 Drawing Sheets

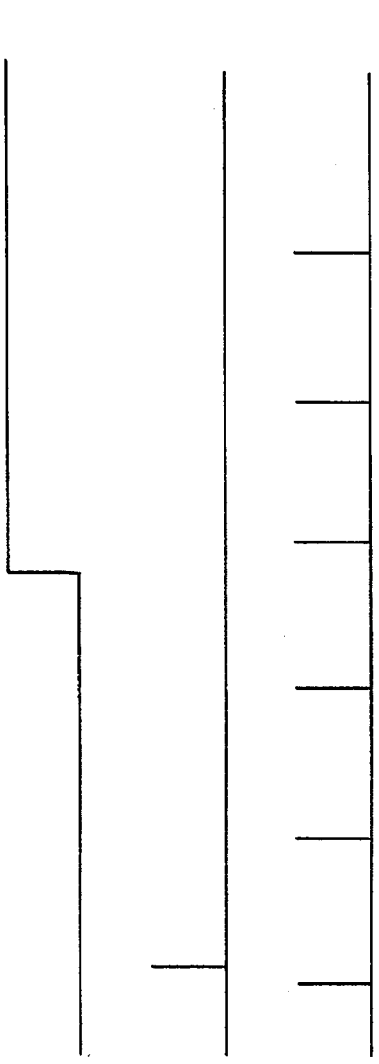
FIG.5(A) BPSK-MODULATED SIGNAL
FIG.5(B) OUTPUT OF 90° PHASE-SHIFTER 18
FIG.5(C) HIGH SPEED PULSE
FIG.6(A) BPSK-MODULATED SIGNAL
FIG.6(B) OUTPUT OF 90° PHASE-SHIFTER 18
FIG.6(C) HIGH SPEED PULSE

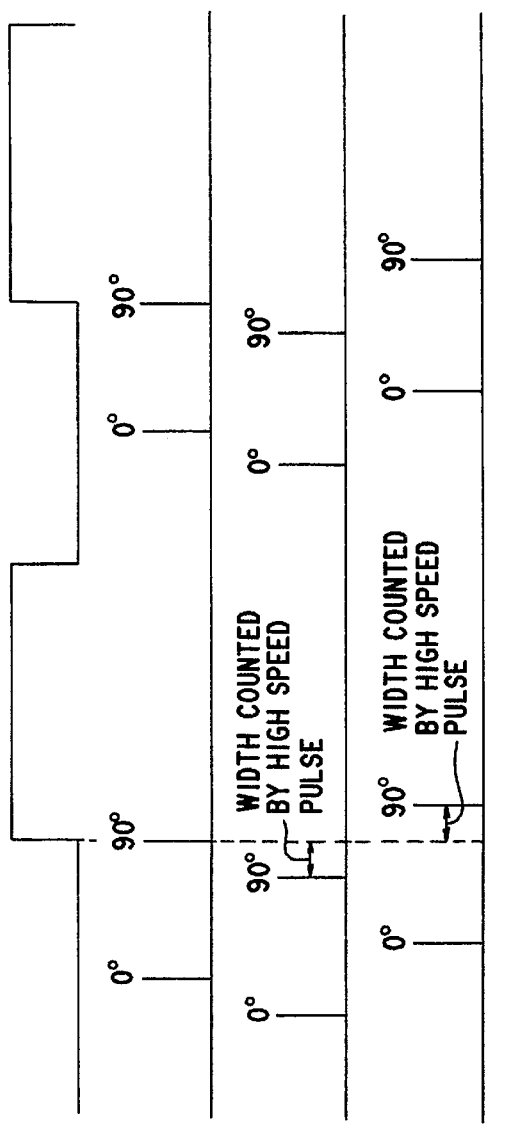
FIG.7(A) BPSK-MODULATED SIGNAL
FIG.7(B) OSCILLATION SIGNAL (IN PHASE)
FIG.7(C) OSCILLATION SIGNAL (ADVANCED)
FIG.7(D) OSCILLATION SIGNAL (DELAYED)

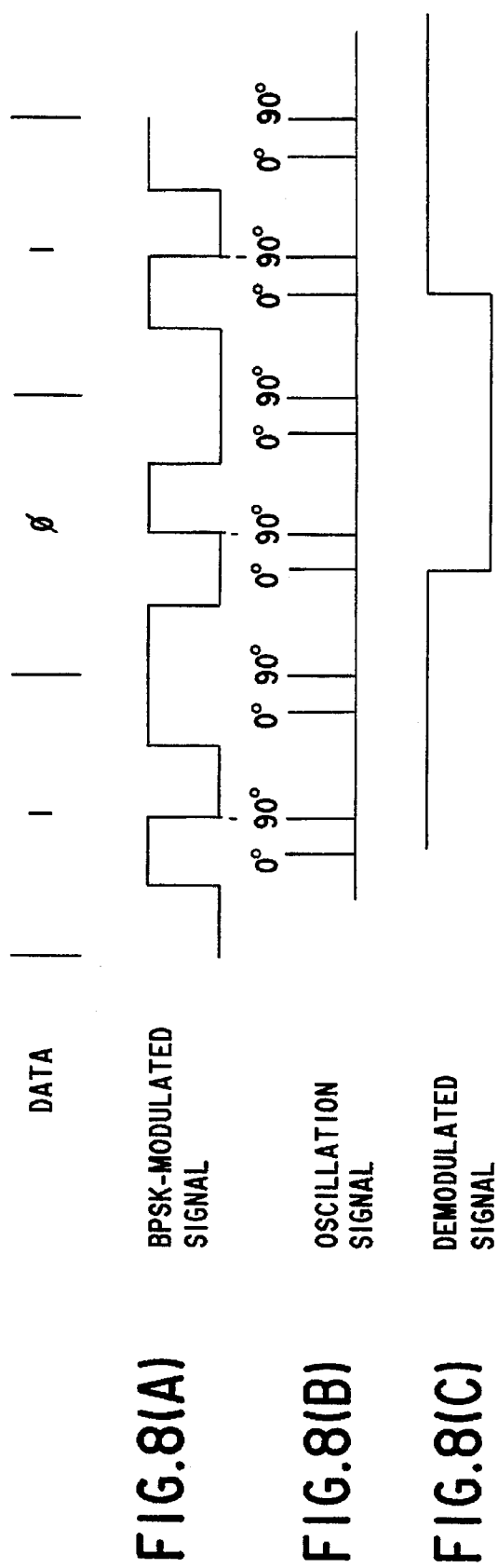

COSTAS LOOP AND DATA IDENTIFICATION APPARATUS

BACKGROUND OF THE INVENTION

1. Field of the Invention

The present invention relates to a costas loop and a data identification apparatus. More specifically, the present invention relates to a costas loop which demodulates a BPSK-modulated signal, and a data identification apparatus which identifies whether or not predetermined data is included in a demodulated signal.

2. Description of the Prior Art

One example of a kind of a complex PLL called a costas loop after Costas, J. P., or an I-Q loop is disclosed in pages 166–168 of a book "Spread Spectrum System" (R. C. Dixon, translated by Tatsuno Satoshi et al.) JATEC. With referring to FIG. 16, in a costas loop 1, a BPSK-modulated signal is multiplied by an oscillation signal from a VCO (Voltage Controlled Oscillator) 3 by a multiplier 2a, and multiplied by the oscillation signal being phase-shifted by a 90° phase-shifter 4 by a multiplier 2b. Outputs from the multipliers 2a and 2b are filtered by low-pass filters (LPF) 5a and 5b, respectively, and an output from the LPF 5a is output as a BPSK-demodulated signal, and the outputs from the LPFs 5a and 5b are multiplied with each other by a multiplier 2c. Then, an output of the multiplier 2c is applied to the VCO 3 via a loop filter 6, whereby an oscillation frequency of the VCO 3 is controlled.

The BPSK-modulated signal is represented as "$\pm A \cos(\omega t)$", the output of the VCO 3 is represented as "$\cos(\omega t + \Delta)$". In addition, "$\Delta$" is an error of phase-shift. Therefore, the output of the multiplier 2a becomes "$\pm A(\cos\Delta + \cos(2\omega t + \Delta))/2$", and when the output is filtered by the LPF 5a, a high-frequency component included therein is removed, "$\pm A\cos\Delta/2$" remains. This component can be approximated to "$A/2$" when "$\Delta$" becomes zero, being demodulated data.

On the other hand, the output of the LPF 5b becomes "$\pm \sin \Delta/2$" as similar to the above. If the output of the LPF 5a is multiplied by the output of the LPF 5b by the multiplier 2c, a multiplication result becomes "$\sin(2\Delta)/4$". Therefore, when "$\Delta$" is small, "$\sin(2\Delta)/4 \approx \Delta/2$" is obtained, and therefore, it is possible to control the VCO 3 such that the "$\Delta$" becomes zero. In addition, a constant for a control system is set in the loop filter 6.

Such a costas loop 1 is almost constructed by analog circuits, and therefore, it is difficult to incorporate the costas loop 1 in an integrated circuit. Furthermore, since the costas loop 1 is constructed by analog circuits, there were problems that troublesome adjustment is required and that an influence of a change of temperature is large.

SUMMARY OF THE INVENTION

Therefore, a principal object of the present invention is to provide a costas loop capable of being easily incorporated in an integrated circuit.

Another object of the present invention is to provide a data identification circuit suitable for a costas loop constructed by digital circuits.

A costas loop according to a first invention comprises: a digital signal means which receives a modulated signal and outputs a digital modulated signal; an oscillation signal output means which is controlled by a control signal and outputs a first oscillation signal and a second oscillation signal having a predetermined phase-difference with respect to the first oscillation signal; a first latch means for latching the digital modulated signal according to the first oscillation signal; a second latch means for latching the digital modulated signal according to the second oscillation signal; a phase-comparison means for comparing a phase of the digital modulated signal and a phase of the second oscillation signal with each other on the basis of outputs of the first latch means and the second latch means; and a filter means for filtering a comparison result by the phase-comparison means, wherein an output of the filter means functions as the control signal.

A second invention is a data identification apparatus which identifies whether or not predetermined data is included in a digital modulated signal, and comprises: a detection means for detecting the number of at least one of "0" and "1" included in the digital demodulated signal of a predetermined length; and a judge means for judging whether or not the predetermined data is included in the digital demodulated signal according to a detection result of the detection means.

In the first invention, the BPSK-modulated signal such as an RDS (Radio Data System) signal is converted into a binary signal by a comparator, for example, and a digital BPSK-modulated signal is latched by the first latch means such as a D-FF according to an oscillation signal from a VCO, for example, and the digital BPSK-modulated signal is also latched by the second latch means such as a D-FF according to the oscillation signal being phase-shifted by a 90° phase-shifter, for example. The output from the first latch means becomes a demodulated signal (RDS signal).

On the other hand, in an phase-comparator, for example, a phase difference between the BPSK-modulated signal and the oscillation signal from the VCO or a phase difference between the BPSK-modulated signal and the oscillation signal being phase-shifted by 90 degrees is selected according to a calculation result by an EXOR circuit which receives the outputs from the first and second latch means, for example, and the same is outputted as the comparison result.

In a loop filter, for example, a divided value obtained by dividing the comparison result by a predetermined value is sequentially integrated by a digital integrator, for example, included in the loop filter, and an integration result and the comparison result from the phase-comparator are added to each other, and an addition result becomes an output of the loop filter. In the VCO, according to the output from the loop filter, a first constant or a second constant is selected, and by a modulo adder, for example, a third constant is subjected to a modulo addition to modulus the first constant or the second constant as selected. Furthermore, a carry by the modulo addition is detected by a carry detector, for example, and an output of the carry detector becomes the oscillation signal of the VCO.

In the second invention, the numbers of "0" and "1" included in the RDS signal which is obtained through the demodulation according to the first invention, for example, and has a predetermined length are counted by a first counter and a second counter, respectively, and it is determined by the judge means whether or not one of count values of the first counter and the second counter is larger than a predetermined value. If one of the count values is larger than the predetermined value, it is determined that an ARI (Autofahrer Rundfunk Informations) signal, for example, is included in the RDS signal, and a high level signal is outputted from the judge means.

In accordance with the first invention, since respective circuits can be made by digital circuits, it is possible to incorporate a costas loop in an integrated circuit.

In accordance with the second invention, since the data can be identified according to the number of at least one of "0" and "1" included in the demodulated signal of the predetermined length, the data included in the demodulated signal according to the first invention can be identified.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIGS. 5(A)–5(C) are a timing chart showing a portion of an operation of FIG. 1 embodiment;

FIGS. 6(A)–6(C) are a timing chart showing a portion of the operation of FIG. 1 embodiment;

FIG. 7(A) is a waveform chart showing a BPSK-modulated signal, and FIG. 7(B) to 7(D) are waveform charts showing oscillation signals;

FIG. 8(A) is a waveform chart showing the BPSK-modulated signal, FIG. 8(B) is a waveform chart showing the oscillation signal, and FIG. 8(C) is a waveform chart showing a demodulated signal;

DETAILED DESCRIPTION OF THE PREFERRED EMBODIMENTS

Figure 1:
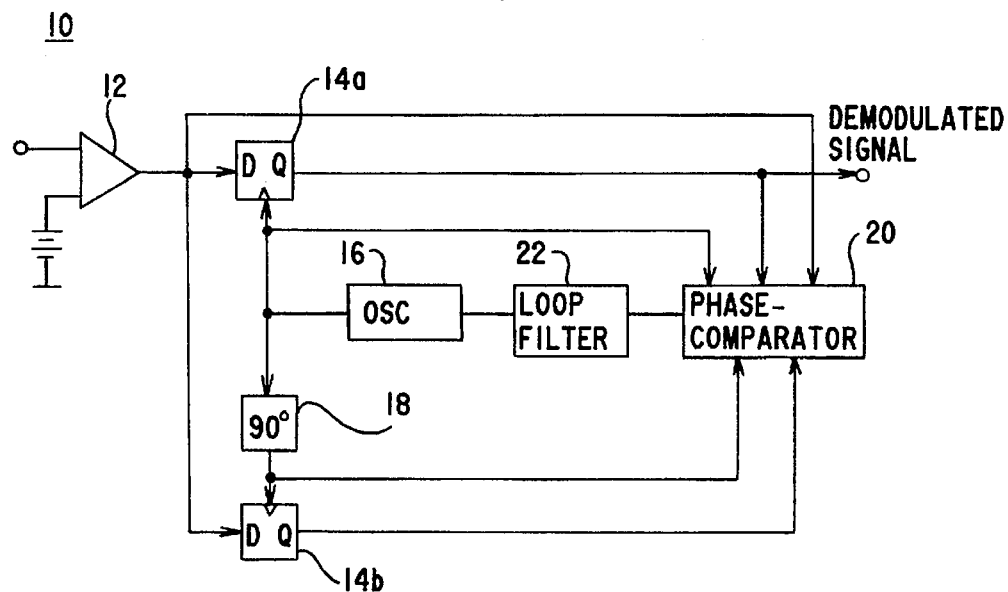
FIG. 1 is a block diagram showing one embodiment according to a first invention.

With referring to FIG. 1, a costas loop 10 of this embodiment shown includes a comparator 12. A BPSK-modulated signal of an RDS signal is compared with a reference voltage by the comparator 12, whereby the BPSK-modulated signal is converted into a binary signal. The BPSK-modulated signal being a binary signal is applied to D-FFs 14a and 14b, respectively. The digital BPSK-modulated signal is latched by the D-FF 14a according to an oscillation signal output from a VCO 16, and the digital BPSK-modulated signal is also latched by the D-FF 14b according to an oscillation signal which is output from the VCO 16 and then phase-shifted by a 90° phase-shifter 18.

An output signal from the D-FF 14a is output as a demodulated signal (RES signal), and applied to a phase-comparator 20 which also receives an output of the D-FF 14b. To the phase-comparator 20, the oscillation signal output from the VCO 16, the oscillation signal output from the 90° phase-shifter 18 and the digital BPSK-modulated signal are further applied. A phase-comparison result is outputted from the phase-comparator 20 on the basis of these signals, and the phase-comparison result is applied to the VCO 16 via a loop filter 22, whereby an oscillation frequency of the VCO 16 is controlled.

In addition, in this embodiment shown, a first oscillation signal is withdrawn from the VCO 16, and a second oscillation signal is withdrawn from the 90° phase-shifter 18.

Figure 2:
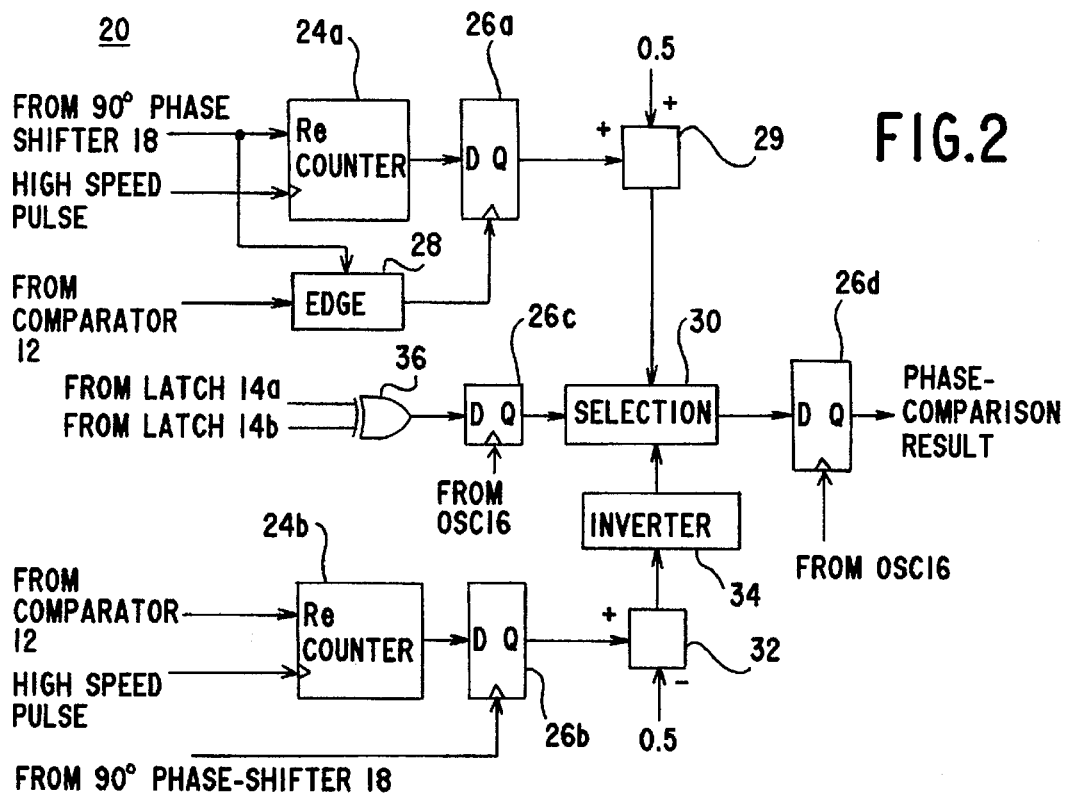
FIG. 2 is a block diagram showing a portion of FIG. 1 embodiment.

Structure of the phase-comparator 20 is shown in FIG. 2. A phase-comparator 20 includes a counter 24a which is incremented by a high-speed pulse shown in FIG. 5(C) from an independent clock generator or oscillator and reset by the oscillation signal (FIG. 5(B)) from the 90° phase-shifter 18, and a count value of the counter 24a is applied to a D-FF 26a. The D-FF 26a also receives a selection signal from an edge selector 28 which selects only an edge just after the oscillation signal from the 90° phase-shifter 18 is input out of edges of the BPSK-modulated signal shown in FIG. 5(A), whereby the count value is latched. Therefore, the count value as latched indicates the number of the high-speed pulses between the oscillation signal FIG. 5(B) and the edge of the BPSK-modulated signal just after the oscillation signal FIG. 5(A). In this embodiment shown, the number of the high-speed pulses between the oscillation signal and the edge of the BPSK-modulated signal is "2" as can be seen from FIG 5(C).

In addition, because a frequency of the BPSK-modulated signal is double the oscillation signal, and in the BPSK-modulated signal, there are edges which can not be used for latching the count value, only the edge of the BPSK-modulated signal just after the oscillation signal is input is selected by the edge selector 28.

The count value latched by the D-FF 26a is added to a constant "0.5" by an adder 29, and an addition result is applied to a selection circuit 30. In addition, a reason why the constant "0.5" is added to the count value by the adder 29 is that the edges of the BPSK-modulated signal are not in synchronous with the high-speed pulse, and on an average, each edge exists a center between a high-speed pulse and a next high-speed pulse.

Phase-comparator 20 also includes a counter 24b which is incremented by the high-speed pulse shown in FIG. 6(C) and reset by the BPSK-modulated signal shown in FIG. 6(A), and a count value of the counter 24b is latched by a D-FF 26b according to the oscillation signal (FIG. 6(B)) from the 90° phase-shifter 18. Therefore, the count value as latched indicates the number of the high-speed pulses existing between the edge of the BPSK-modulated signal FIG. 6(A) and the oscillation signal FIG. 6(B) from the 90° phase-shifter 18 just after the edge. In this embodiment shown in FIG. 6, the number of the high-speed pulses existing between the edge of the BPSK-modulated signal and the oscillator signal from the 90° phase-shifter 18 just after the edge is "3" as can be seen from FIG. 6(C).

Then, a constant "0.5" is subtracted from the count value as latched by a subtracter 32. A sign (+or −) of a value from the subtracter 32 is inverted by an inverter 34, and a value having an inverted sign is applied to the selection circuit 30. In addition, a reason why the constant "0.5" is subtracted by the subtracter 32 is similar to the above described reason.

Furthermore, a reason why the sign is inverted is that it is necessary to make a phase control reverse with respect to a case of FIG. 5.

On the other hand, the output signals from the latches 14a and 14b are applied to an EXOR circuit 36, thereby to be subjected to an exclusive logic sum. Therefore, when the phase of the oscillation signal is advanced to the BPSK-modulated signal, as shown in FIG. 7(A) and FIG. 7(C), "0" is output from the EXOR circuit 36. When the phase of the oscillation signal is delayed to the BPSK-modulated signal, as shown in FIG. 7(A) and FIG. 7(D), "1" is output from the EXOR circuit 36. An output of the EXOR circuit 36 is latched by a D-FF 26c according to the oscillation signal from the VCO 16.

An output of the D-FF 26c is then applied to the selection circuit 30, whereby any one of the signal from the adder 28 and the signal from the inverter 34 is selected. That is, if the output from the D-FF 26c is "0", the signal from the adder 28 is output from the selection circuit 30, and if the output from the D-FF 26c is "1", the signal from the inverter 34 is output from the selection circuit 30. A signal thus selected by the selection circuit 30 is output as a phase-comparison result via a D-FF 26d which latches the signal according to the oscillation signal from the VCO 16.

Figure 3:
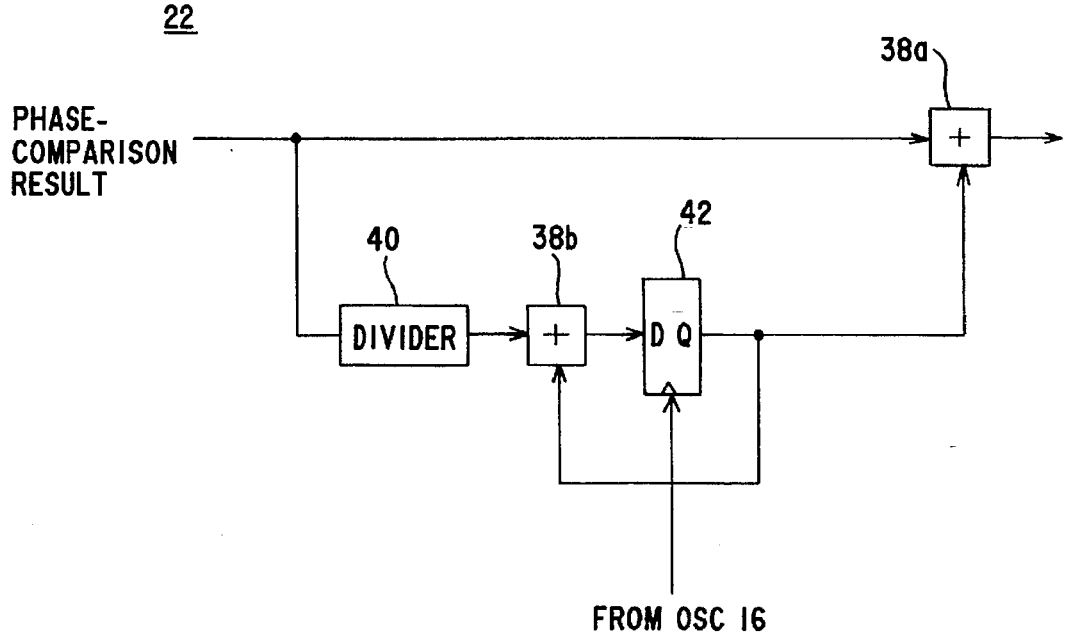
FIG. 3 is a block diagram showing another portion of FIG. 1 embodiment.

Structure of the loop filter 22 to which the phase-comparison result is input is shown in FIG. 3. The phase-comparison result is applied to an adder 38a and a divider 40. A divider 40 divides the phase-comparison result by "R2", i.e. makes the phase-comparison result "1/R2", and an output from the divider 40 is applied to an adder 38b which also receives an output of a D-FF 42 which latches an addition result from the adder 38b according to the oscillation signal of the VCO 18, whereby the output of the divider 40 is integrated. An output of the D-FF 42 is then added to the phase-comparison result by the adder 38a, and only a sign (+ or −) of an addition result is output from the adder 38a.

On the analogy of an analog loop filter, the loop filter 22, will be described. A transfer function of the analog loop filter is represented by the following equation (1).

$$Y = (R2/R1) + (1/SR1C) \qquad (1)$$

Since the loop filter 22 is a digital filter, by subjecting the equation (1) to a bilinearity conversion, the transfer function can be represented by the following equation (2).

$$Y_D = (R2/R1) + \{(T/2R1C)(1+Z^{-1})/(1-Z^{-1})\} \qquad (2)$$

In addition, "T" indicates a sampling period. Furthermore, "1+Z$^{-1}$" of a numerator means an addition of a value of a given sampling time and a value of a next sampling time; however, it is possible to consider that a difference between the values is small, and therefore, it is obtainable that "1+Z$^{-1}$≈2". Resultingly, the equation 2 can be represented by the following equation (3).

$$Y_D = (R2/R1) + \{(T/R1C)/(1-Z^{-1})\} \qquad (3)$$

Now, if constants are determined such that R2/R1=1 and T/RIC=1/R2 are obtainable, "1/(1−Z$^{-1}$)" becomes a digital integration wherein inputs are sequentially integrated, and therefore, in the loop filter 22, the input and an output of the digital integration of a value that the input is divided by "R2" are added.

Figure 4:
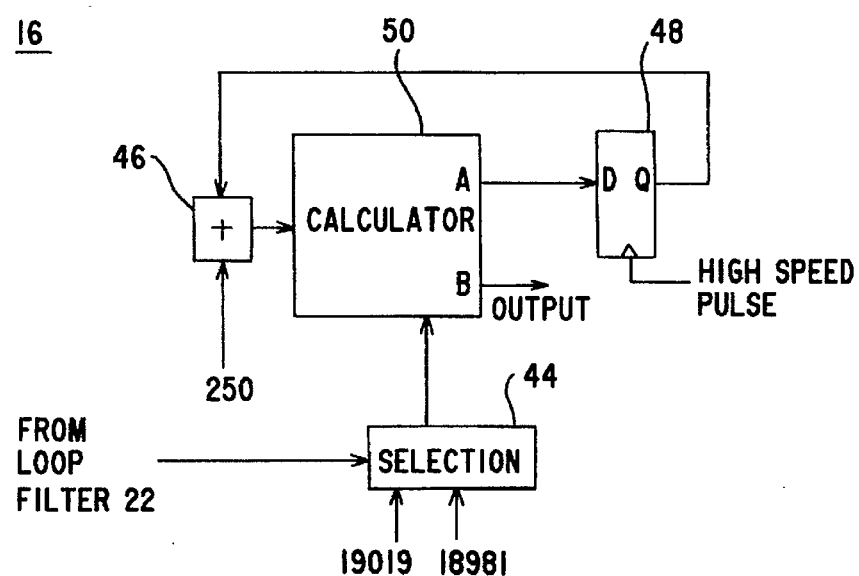
FIG. 4 is a block diagram showing other portion of FIG. 1 embodiment.

Structure of the VCO 16 is shown in FIG. 4. Constants "19019" and "18981" are applied to a selection circuit 44, and one of the constants is selected according to the output from the loop filter 22. That is, if the sign of the output from the loop filter 22 is "+", the constant "19019" is selected, and if the sign is "−", the constant "18981" is selected. Furthermore, a constant "250" is applied to an adder 46 in which an output of a D-FF 48 and the constant "250" are added to each other. A selection result by the selection circuit 44 and an addition result of the adder 46 are applied to a calculator 50, and compared with each other by the calculator 50. Then, if the selection result is larger than the addition result, the addition result is output as it is from a terminal A, and a low level signal is output from a terminal B. If the selection result is equal to or smaller than the addition result, "addition result−selection result" is output from the terminal A, and a high level signal is output from the terminal B. In addition, the D-FF 48 latches an output from the calculator 50 according to the high-speed pulse.

An operation principle of the VCO 16 will be described. If a constant N is sequentially added with modulo N/f, a frequency that the carry occurs becomes "f" Accordingly, by preparing modulo (N/f−Δ) and modulo (N/f−Δ), and by selecting one of them according to an input, it is possible to obtain two kinds of frequencies of "1/(1/f+Δ/N)≈f−Δ/N" and "1/(1/f−Δ/N)≈f+Δ/N". If it is required to advance the phase, "f+Δ/N" may be selected, and if it is required to delay the phase, "f−Δ/N" may be selected.

On the assumption that a data transfer speed is 1 bps, a carrier frequency is 24 Hz, and the high-speed pulse is 1824 Hz, the operation of the VCO 16 will be described.

Since the frequency of the high-speed pulse is 1824 Hz, at a time that the constant "19019" is selected by the selection circuit 44, the oscillation frequency becomes 23.976 Hz (≈1824×250/19019), and if the constant "18981" is selected by the selection circuit 44, the oscillation frequency becomes 24.024 Hz (≈1824×250/18981). Therefore, if it is required to advance the phase, the constant "18981" may be selected, and if the phase is to be delayed, the constant "19019" may be selected. In addition, the 90° phase-shifter 18 is constructed by a delay circuit, and by delaying a signal by 1/(24×4) seconds, it is possible to phase-shift by 90 degrees of a signal of 24 Hz.

Thus, when the edge of the binary BPSK-modulated signal shown in FIG. 8(A) and a 90° phase-shifted component of the oscillation signal shown in FIG. 8(A) are coincident with each other in a phase by controlling the oscillation frequency of the VCO 16, the phase of the oscillation signal from the VCO 16 becomes to be coincident with a center of a half wave of a carrier signal of the BPSK-modulated signal. Therefore, if the BPSK-modulated signal shown in FIG. 8(A) is applied to the D-FF 14a and latched therein according to the oscillation signal from the VCO 16, correct data can be demodulated as shown in FIG. 8(C).

According to the embodiment, since the costas loop 10 can be constructed with utilizing digital circuits, it is possible to incorporated the costas loop 10 in an integrated circuit, and accordingly, troublesome adjustment for the circuits become unnecessary, and it is possible to suppress the influence of the change of temperature. Furthermore, since it is not required to provide an LPF as done in a prior art analog costas loop, it is possible to reduce the number of components.

Figure 9:
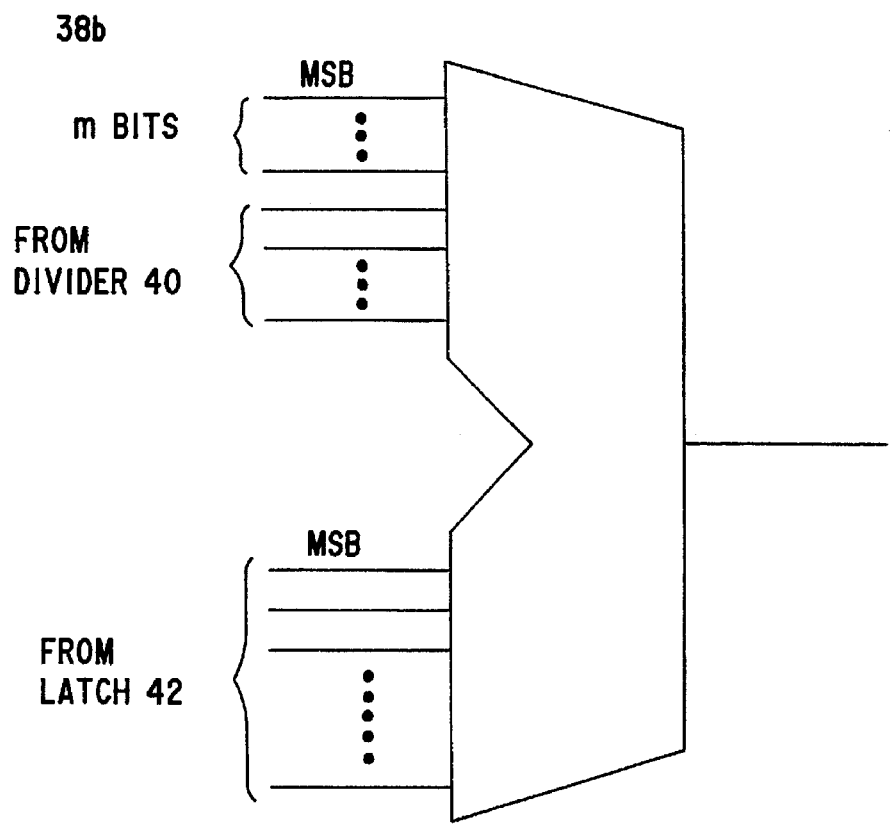
FIG. 9 is a block diagram showing a portion of another embodiment according to the first invention.

In addition, in the above described embodiment, the dividing value of the divider 40 shown in FIG. 3 is "R2", i.e. "1/R2"; however, if the dividing value is "2$^M$ (M is an integer)", i.e. "1/2$^M$" as shown in FIG. 9, the output of the divider 40 may be input to the adder 38b with shifting the output by m bits from the MSB.

Figure 10:
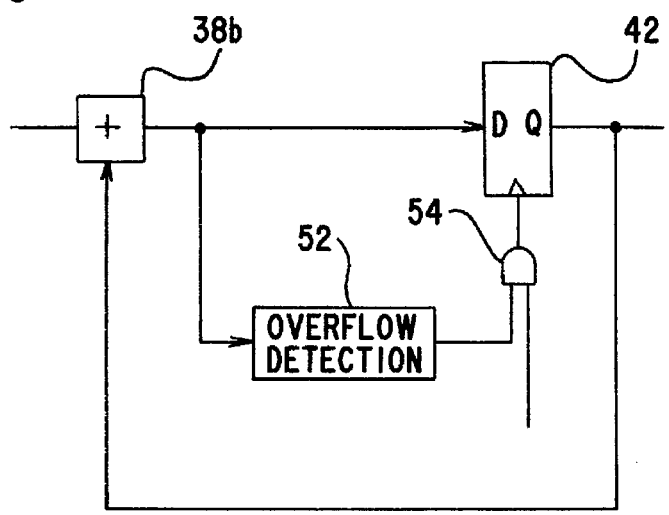
FIG. 10 is a block diagram showing a portion of another embodiment according to the first invention.

If an absolute value of the output of the adder 38b shown in FIG. 3 becomes too large, there is a possibility that an overflow occurs. Therefore, in order to prevent the overflow, a overflow detection circuit 52 which detects that the absolute value of the output of the adder 38b is overflowed, and a gate 54 may be provided as shown in FIG. 10. In such a case, if the overflow is detected by the overflow detection circuit 52, the oscillation signal is inhibitted from being passed through the gate 54.

Figure 11:
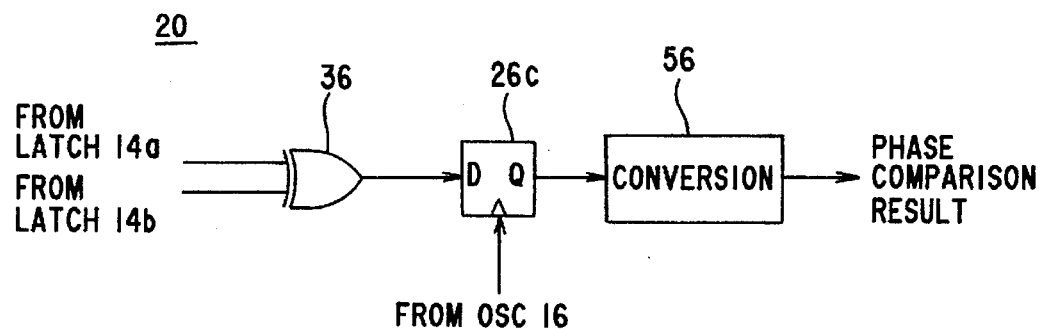
FIG. 11 is a block diagram showing a portion of other embodiment according to the first invention.
Figure 12:
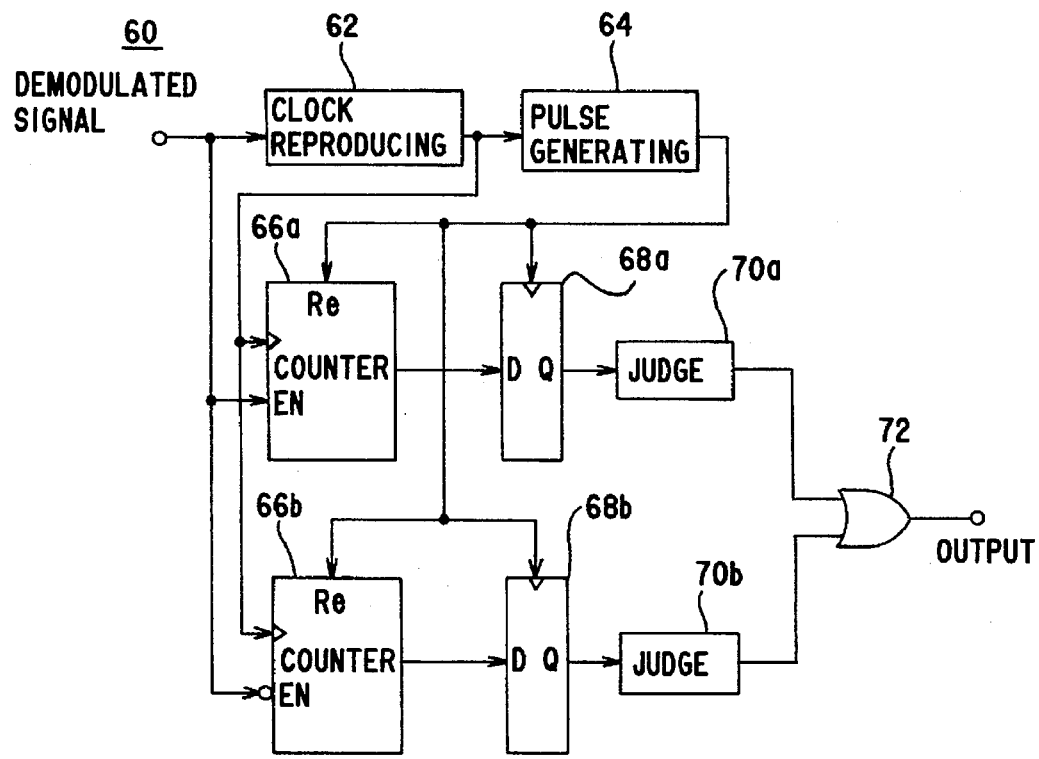
FIG. 12 is a block diagram showing one embodiment according to a second invention.

Furthermore, in order to simplify the structure of the phase-comparator 20, the phase-comparator 20 may be modified as shown in FIG. 11. More specifically, the phase-comparator 20 shown in FIG. 11 includes a conversion circuit 56 which converts "0" and "1" included in the output of the EXOR circuit 36 and thus the D-FF 26c into "+1" and "−1", respectively. As similar to the above described embodiment, the outputs from the latch circuits 14a and 14b are applied to the EXOR circuit 36, and the VCO 16 may be controlled on the basis of an output of the conversion circuit 56. That is, if the output of the D-FF 26c is "0", by regarding as that the phase of the oscillation signal is advanced, the phase of the oscillation signal is delayed on the basis of "+1" of the output of the conversion circuit 56, and if the output of the D-FF 26c is "−1", by regarding as that the phase of the oscillation signal is delayed, the phase may be advanced on the basis of "−1"of the output of the conversion circuit 56.

The ARI signal has an amplitude of three times the RDS signal, and the ARI signal and the RDS signal have a quadrative relationship. Therefore, both signals can be represented by the following fomula (4).

$$\pm A \cos(\omega t) + 3A \sin(\omega t) \tag{4}$$

where, "$\pm A \cos(\omega t)$" is the RDS signal, and "$3A \sin(\omega t)$"is the AIR signal.

Figure 16:
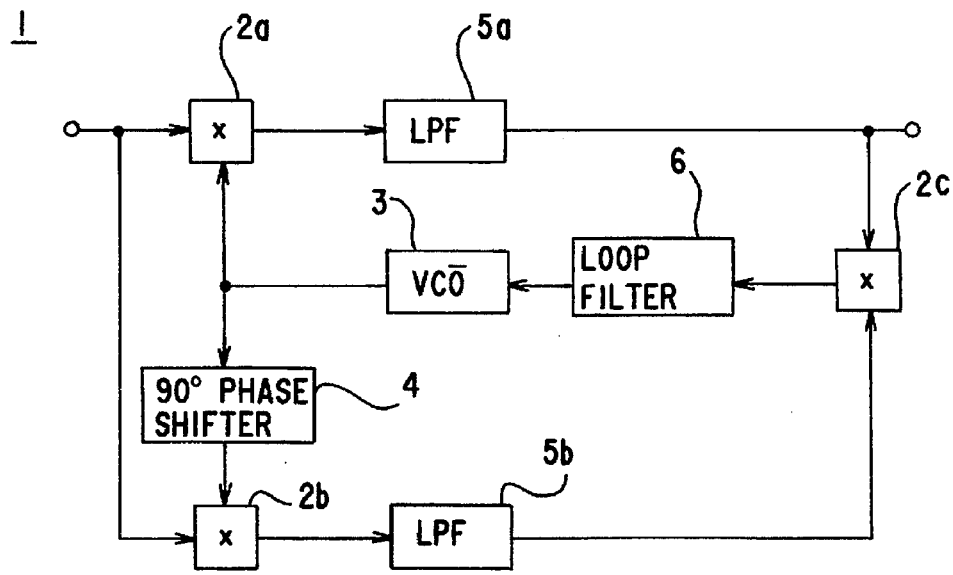
FIG. 16 is a block diagram showing a prior art.

If the signal represented by the fomula (4) is applied to the prior art costas loop 1 shown in FIG. 16, an output of the VCO 3 becomes "$\sin(\omega t)$" or "$-\sin(\omega t)$", and the output of the multiplier 2b becomes the data. Therefore, if there is no ARI signal, the data is to be picked-up from the output of the multiplier 2a, and if there is the AIR signal, the data is to be picked-up from the output of the multiplier 2b, and accordingly, it is necessary to determine whether the AIR signal is present or absent. Then, in the prior art, such determination is performed according to an output level of the multiplier 2b. That is, if there is no ARI signal, the output of the multiplier 2a is "±A", and if there is the AIR signal, the output of the multiplier 2a becomes "±3A", and accordingly, the presence or absence of the ARI signal was determined on the basis of the level.

However, in the costas loop 10 of FIG. 1 embodiment, since the BPSK-modulated signal is converted into a binary signal by the comparator 12, an output level of the D-FF 14a becomes constant, and therefore, in FIG. 1 embodiment, it is impossible to determine whether the ARI signal is present or absent according to the level. A data identification apparatus 60 of one embodiment shown in FIG. 10 can solve such a problem.

Figure 13:
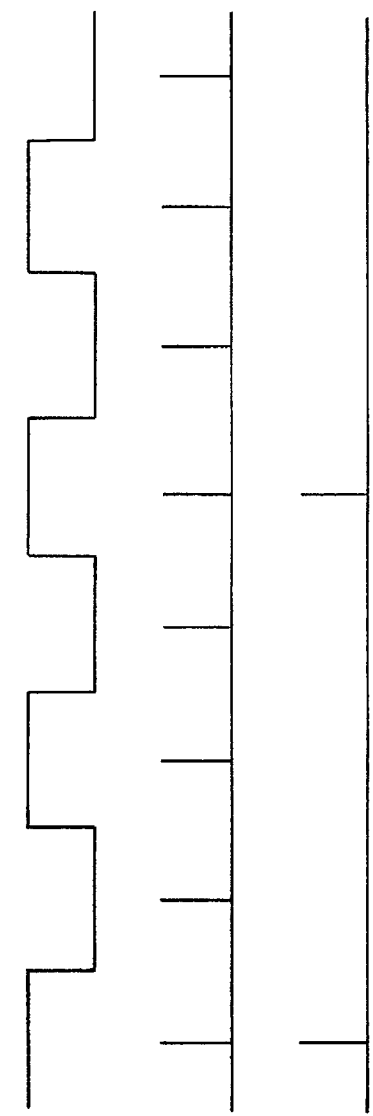
FIG. 13(A) is a waveform chart showing the BPSK-modulated signal.
FIG. 13(B) is a waveform chart showing a reproduced clock.
FIG. 13(C) is a waveform chart showing a pulse.

The demodulated signal (FIG. 13(A)) being output from the costas loop 10 shown in FIG. 1 is applied to a clock reproduction circuit 62 by which a clock (FIG. 13(B)) that is in synchronous with the demodulated signal is reproduced. A reproduced clock from the reproduction circuit 62 is applied to a pulse generation circuit 64, and a pulse shown in FIG. 13(C) is outputted from the pulse generation circuit 64 at every timing that the clock is applied four times.

The clock from the clock reproduction circuit 62 and the pulse from the pulse generation circuit 64 are applied to counters 66a and 66b which are incremented by the clock and reset by the pulse. Furthermore, the demodulated signal is applied to the counters 66a and 66b as an enable signal for each of them. Then, if the demodulated signal is "1", the counter 66a is enabled, and when the demodulated signal is "0", the counter 66b is enabled.

Count values output from the counters 66a and 66b are respectively latched by D-FFs 68a and 68b according to the pulse from the pulse generation circuit 64. Therefore, the count values latched by the D-FFs 68a and 68b indicate the number of "1" and the number of "0", respectively, between adjacent pulses. The count values latched by the latches 68a and 68b are applied to the judge circuits 70a and 70b, and it is determined whether or not the number of "1" and the number of "0" are larger than predetermined values, respectively, by the judge circuits 70a and 70b. If the number of "1" or the number of "0" is larger than the predetermined value, the high level signal is outputted from the judge circuit 70a or 70b, and the same is applied to an OR circuit 72. Therefore, if the number of "1" or the number of "0" is larger than the predetermined value, a high level signal is outputted from the OR circuit 72, and if both of the number of "1" and the number of "0" are respectively smaller than the predetermined values, a low level signal is output from the OR circuit 72.

If the demodulated signal does not contain the ARI signal, the number of "0" and the number of "1" of the demodulated signal are equal to each other; however, if the demodulated signal contains the ARI signal, a portion of the ARI signal in the demodulated signal becomes to have only "0" or "1". Therefore, by counting the number of "1" or "0" included in the demodulated signal, it is possible to identify the ARI data. In addition, actually, since there are data errors, it is determined that the ARI signal is included in the demodulated signal when the number of "1" or "0" is more than the predetermined value.

Figure 14:
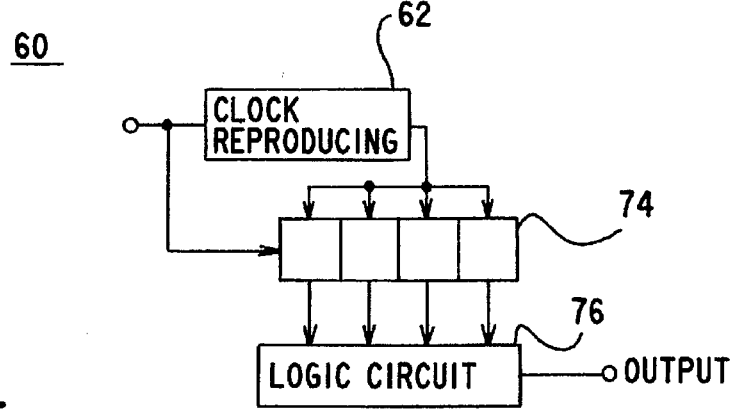
FIG. 14 is a block diagram showing another embodiment according to the second invention.
Figure 15:
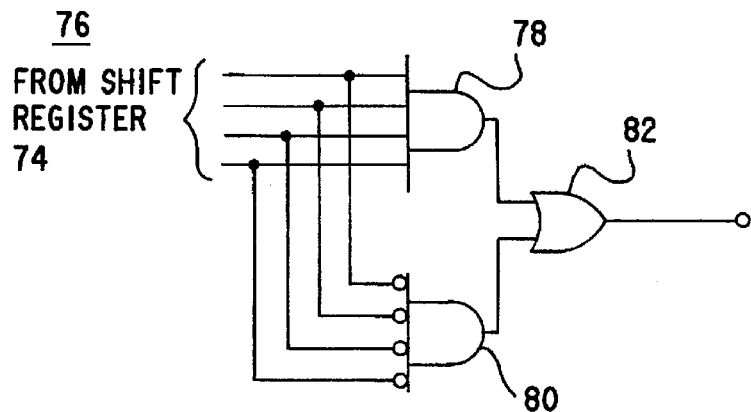
FIG. 15 is a block diagram showing a portion of FIG. 12 embodiment.

With referring to FIG. 14, a data identification apparatus 60 of another embodiment according to the present invention includes a shift register 74 which fetches the data demodulated signal according to the clock reproduced by the clock reproduction circuit 62, and shifts the data as fetched. A logic circuit 76 outputs one of a high level signal and a low level signal according to the number of "0" and the number of "1" in the data within the shift register 74. More specifically, as shown in FIG. 15, when a signal according to the data within the shift register, i.e. the data is "1", the output of the logic circuit 74 becomes a high level, and if the data is "0", the output becomes a low level. The output of the logic circuit 76 is applied to an AND circuit 78 and a NAND circuit 80, and output signals from the AND circuit 78 and the NAND circuit 80 are outputted from an OR circuit 82. Therefore, if all the numerals or data within the shift register 74 are "1" or "0", the high level signal is outputted from the logic circuit 76, and if one or more different numerals are included in the shift register 74, the low level signal is outputted from the logic circuit 76.

According to these embodiments, since it is possible to determine the presence or absence of the ARI signal with utilizing only digital circuits, the data identification apparatus can be applied to the digital costas loop, and can be incorporated in an integrated circuit.

In addition, in the above described embodiments, the description is made with utilizing the RDS signal and the ARI signal; however, it is needless to say that the present invention can be applied to any kinds of signals capable of being identified by the number of "1" or "0" included in the signal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A costas loop, comprising:

a digital signal means for converting a modulated signal into a digital modulated signal;

an oscillation signal output means for outputting a first oscillation signal and a second oscillation signal having a predetermined phase difference with respect to said first oscillation signal, an oscillation frequency of said oscillation signal output means being controlled by a control signal;

a first latch means for latching said digital modulated signal according to said first oscillation signal;

a second latch means for latching said digital modulated signal according to said second oscillation signal;

a phase-comparison means for comparing a phase of said digital modulated signal and a phase of said second oscillation signal with each other on the basis of outputs of said first latch means and said second latch means; and a filter means for filtering a comparison result by said phase-comparison means, an output of said filter means functioning as said control signal.

2. A costas loop according to claim 1, wherein said phase-comparison means includes a calculation means for evaluating an exclusive logic sum of the outputs of said first latch means and said second latch means.

3. A costas loop according to claim 1, wherein said phase-comparison means includes an edge detection means for detecting an edge of said digital modulated signal, and a counter for counting a time interval between an output of said edge detection means and said first oscillation signal.

4. A costas loop according to any one of claims 1 to 3, wherein said filter means includes an integration means for sequentially integrating a signal associated with said comparison result according to said first oscillation signal, and a first addition means for adding said comparison result and an integration result of said integration means to each other.

5. A costas loop according to claim 4, wherein said integration means includes a second addition means for adding said comparison result and said integration result to each other, and a third latch means for latching an addition result of said second addition means according to said first oscillation signal, and an output of said third latch means becomes said integration result.

6. A costas loop according to claim 4, wherein said integration means includes a second addition means for adding said comparison result and said integration result to each other, a overflow detection means for detecting that an overflow occurs in an absolute value of an addition result of said second addition means, a gate means for gating said first oscillation signal according to a detection result of said overflow detection means, and a third latch means for latching said addition result according to an output of said gate means, and an output of said third latch means becomes said integration result.

7. A costas loop according to any one of claims 1 to 3, wherein said oscillation signal outputs means includes an oscillation means including a first constant generation means for generating a first constant, a second constant generating means for generating a second constant, a selection means for selecting one of said first constant and said second constant according to said control signal, a third constant generation means for generating a third constant, a modulo addition means for sequentially modulo-adding said third constant to modulus of an output of said selection means, and a carry detection means for detecting a carry of said modulo addition means, and an output of said carry detecting means becomes an oscillation signal of said oscillation means.

* * * * *